United States Patent [19]

Morrow

[11] Patent Number: 4,947,155
[45] Date of Patent: Aug. 7, 1990

[54] LEAKAGE RESISTANCE DETECTOR AND ALARM CIRCUIT

[75] Inventor: David E. Morrow, Richmond Hill, Canada

[73] Assignee: Electronic Surveillance Corporation, Markham, Canada

[21] Appl. No.: 211,243

[22] Filed: Jun. 24, 1988

[51] Int. Cl.$^5$ .............................................. G08B 21/00
[52] U.S. Cl. .................................... 340/650; 340/627; 361/42
[58] Field of Search ............... 340/660, 661, 662, 663, 340/664, 650, 527, 530; 361/42

[56] References Cited

U.S. PATENT DOCUMENTS

| | | | |
|---|---|---|---|
| 3,987,425 | 10/1976 | Lawton | 340/650 X |
| 4,165,801 | 8/1979 | Watanabe et al. | 361/33 X |
| 4,782,422 | 11/1988 | Jones et al. | 340/664 X |

Primary Examiner—Joseph A. Orsino
Assistant Examiner—Jeffery A. Hofsass

[57] ABSTRACT

An improved detector and alarm circuit for use with electric apparatus which is connected to power lines and where the body of the apparatus is insulated from ground is disclosed. This circuit varies the response time of an alarm in accordance with the magnitude of a sensed voltage thereby reducing the response time as the potential danger increases.

9 Claims, 3 Drawing Sheets

4,947,155

LEAKAGE RESISTANCE DETECTOR AND ALARM CIRCUIT

BACKGROUND OF THE INVENTION

This invention relates to a detector and alarm circuit for use with electric apparatus which is connected to power lines, and where the body of the apparatus is insulated from ground. More particularly, this invention relates to a detector and alarm circuit for electrically powered mobile apparatus such as trolley buses and the like for determining incipient leakage resistance between the body of the apparatus and the power lines such that when the body is insulated from ground and one of the power lines is substantially at ground potential, a voltage occurs on the body of the apparatus which might be hazardous to any human who might come into contact with it.

One such leakage resistance detector and alarm circuit is shown in our earlier U.S. Pat. No. 3,987,425. According to this patent, the circuit provides a warning alarm after experiencing a voltage above a particular level for certain duration and once so sensed, a second delay circuit is activated and if the voltage remains for a second duration, an alarm is activated.

In trolley cars, for example, the overhead lines are such that one is normally at ground potential and the other is at about 600 volts. Leakage will occur between the electrical connections of the lines to the trolley car and the apparatus body will be raised from its normal ground potential. This potential remains on the body as the body is isolated from ground. A certain minimum voltage is normal, however, as this voltage continues to climb, the danger to passengers leaving or entering the car increases as they may provide an electrical connection between the ground and the vehicle body. The danger to the passengers dramatically increases as the voltage of the apparatus body exceeds a predetermined minimum, normally about 30 volts In the case of a complete failure where the apparatus body would be at several hundred volts, the passenger is in extreme danger.

This prior art leakage resistance detector and alarm circuit does not take into account the magnitude of the voltage sensed, and the time duration between the first occurance of the sensed voltage and the time of initiation of a warning is not variable in accoardance with the magnitude of the voltage.

SUMMARY OF THE INVENTION

According to the present invention, in a leakage resistance detector and alarm circuit of the type generally referred to above, an improvement has been made in that means are provided for automatically varying the time period or duration that the sensed voltage has to be present before initiating the warning alarm, with this variation decreasing the time period as a function of the magnitude of the sensed voltage.

According to a preferred aspect of the invention, this time duration is decreased to approximately zero when a maximum voltage is sensed.

In the improved leakage resistance detector and alarm circuit of the present invention, the magnitude of the sensed voltage is taken into account and the time duration to actuation of a warning alarm is decreased in accordance with the magnitude of the second voltage. In this way, the driver of the vehicle will have an immediate warning in the case of an extreme breakdown and will realize there is a potential danger to passengers immediately as opposed to only after the duration of the fixed time period of the prior art devices.

BRIEF DESCRIPTION OF THE DRAWINGS

Preferred embodiments of the invention are shown in the drawings, wherein.

DETAILED DESCRIPION OF THE PREFERRED EMBODIMENTS

Figure 1:
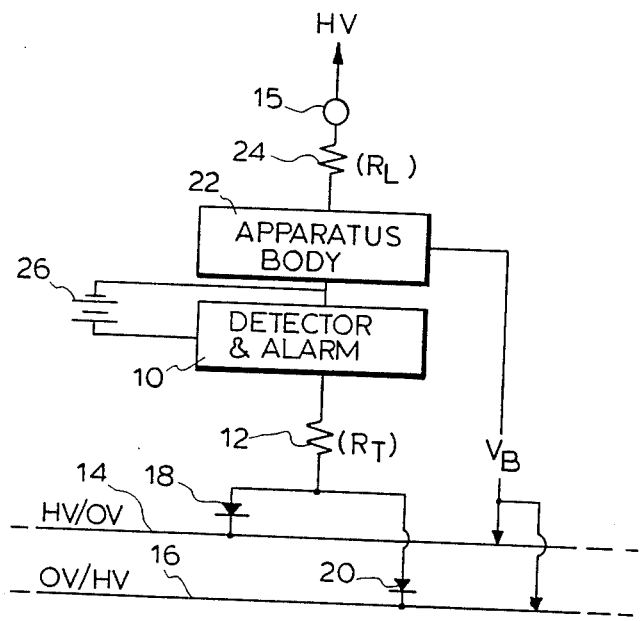
FIG. 1 is a general block diagram showing the relationship of this invention by polar circuit.
Figure 2:
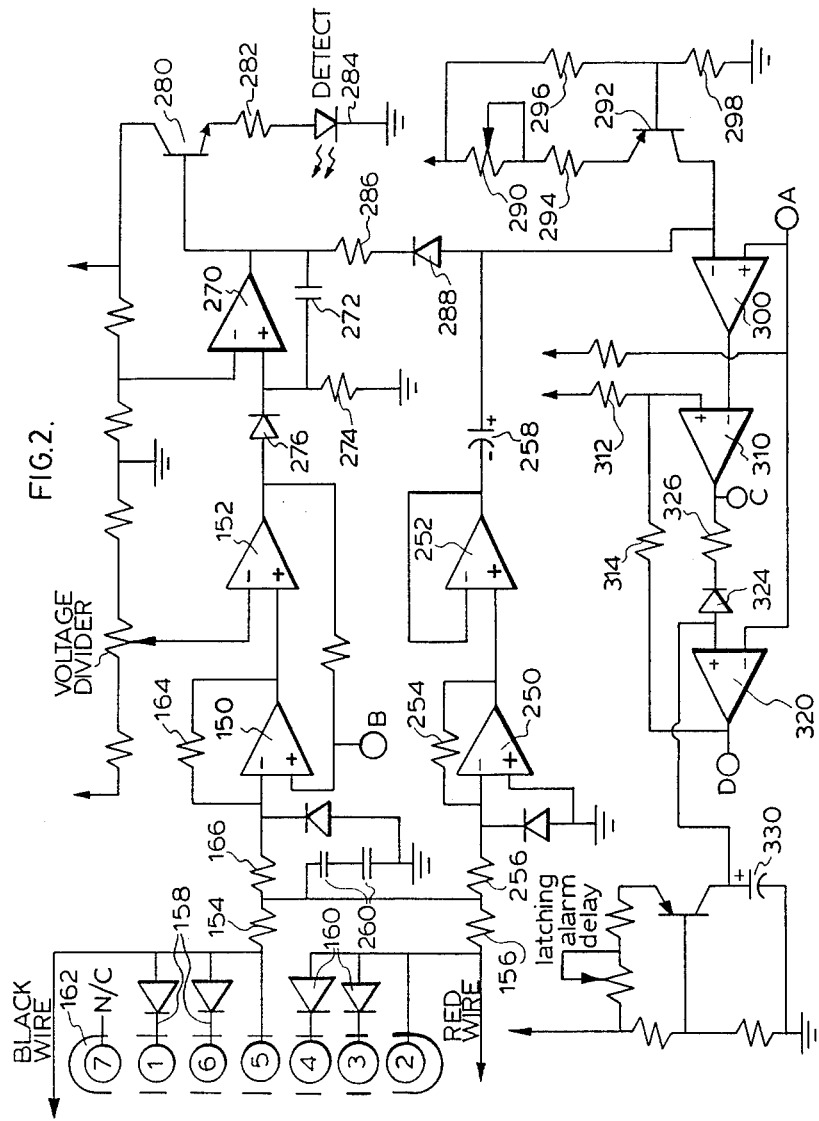
FIG. 2 is a detailed circuit showing various aspects of the components of the detector and alarm circuitry.

Apparatus according to this invention is shown diagrammatically in FIG. 1. and somewhat more specifically in FIG. 2 with respect to the major components of the detector and alarm circuits. Thus, there is shown in FIG. 1, a detector and alarm indicated generally at 10 in series with a resistor 12 which is connected to a pair of lines 14, 16 by a pair of back-to-back diodes 18, 20 respectively. It will be seen from more detailed discussion hereafter that resistor 12 is, at any instant in time, connected only to the most negative one of the pair of electric power lines 14, 16 when there is a voltage difference between them.

The detector and alarm circuitry 10 in accordance with this invention, is further connected in series with the chassis, body or other portion of the apparatus which might be contacted by a human who is at ground potential, and the apparatus body or other portion is shown generally at 22. It, in turn, is connected in series with the resistor shown at 24, which is connected to an electric power line 15. It will be noted in FIGS. 1 and 2 that resistors 12 and 24 are designated $R_T$ and $R_L$ respectively; and those resistors are respectively a known test resistance which is interposed between the apparatus body 22 by way of the detector and alarm circuitry 10 to the most negative one of the electric power lines 14, 16, and the incipient leakage resistance which may occur in the apparatus between the apparatus body 22 and the most positive of the electric power lines, shown at 15 in the drawings. A battery 26 is shown being connected across the detector and alarm circuit 10, and one terminal of the battery 26 is also connected to the apparatus body 22.

In any two wire trolley line installation, one of the electric power lines is nominally at ground potential or zero voltage; and the other of the electric power lines is at the nominal working voltage which is a high voltage relative to ground. The electric power lines are not, however, polarized so that one or the other of the lines is always the OV line or HV line, becuause of the manner in which such overhead lines are connected, particulary at road or line intersections and between separate line sections, etc. Thus, a pair of back-to-back diodes 18, 20 is provided; they are connected respectively to lines 14 and 16. It will be noted that lines 14 and 16 are designated HV/OV and OV/HV respectively; that is to say, when line 14 is the HV line, 16 is the OV line and vice versa. Thus, the lower end of resistor 12 is connected either through diode 18 or diode 20 to whichever of lines 14 and 16 is the most negative line. at any instant in time. Because of the circuit arrangement within the apparatus in which the detector and alarm circuitry according to this invention is installed, the leakage resistance 24 is found between the chassis or body of the apparatus 22 and whichever of lines 14 and 16 is the most positive electric power line—which, for purposes of this discussion and ease of illustration, is shown as line 15 in the drawings.

A resistance network exists between the most positive and most negative of the electric power lines to which the electric apparatus in which the detector and alarm circuitry according to this invention is installed; and that resistor network includes the leakage resistance from the apparatus body to the high voltage line which may be lumped and designated $R_l$, and is shown at resistor 24, and a known test resistor $R_T$ shown as resistor 12.

The apparatus body 22 is, for purposes of this discussion, considered to be a short circuit—that is to say, a zero resistance element in the resistor string; and the resistance string connection within the detector and alarm circuitry 10 from the leakage resistance 24 to the known test resistance 12 is also a zero resistance component. Thereafter, there is installed between the most negative electric power line and the most positive electric power line a known resistance and an unknown incipient leaking resistance, each of which is also connected to the body, chassis or other portion of the apparatus which a human might contact.

It has been noted above that it is desirable that the apparatus body 22 be permitted to rise in voltage relative to the most negative electric power line (which is substantially at ground potential) to only about 30 volts; and that no condition be permitted where a short circuit current from the apparatus body to ground and connected through the leakage resistance 24 to the most positive of the electric power lines 15 may exceed 2 ma. That is to say, $V_B$ as shown in FIG. 1 may not exceed 30 volts relative to the most negative of electric power lines 14, 16; and the leaking current through the resistor string 24, 12 may not exceed 2 ma. Given those conditions, it can be seen that when the value of the known resistance 12 is 15K ohms, a current of 2 ma. through it causes a 30 volt drop across the known resistance. In a conventional trolley system, when the voltage between the electric power lines is 600 VDC, it will be seen that a total resistance which can be accommodated between the electric power lines is 300K, and any resistance lower than that would cause a current of greater than 2 ma. to flow in the resistance string. Thus, because the known resistance 12 is 15K, a leakage resistance 24 of 285K can be tolerated in that circumstance.

When the leakage resistance, in the circumstances described above where the voltage between the electric power lines 14, 16 is 600 VDC, exceeds 285K, current through resistance string 24, 12 does not exceed 2 ma. and the voltage drop across the known test resistance 12 does not exceed 30 volts. If, however, the leakage resistance 24 drops below 285K in the given circumstances, the current through the resistance string 24, 12 exceeds 2 ma., and the voltage drop across the known resistance 12 exceeds 30 volts. A potentially hazardous condition then exists, because a person who stands at ground potential and solidly connects to the apparatus body 22 would then be in series with the leakage resistance 24 to the HV line, and when the leakage resistance 24 has reduced to the extent that a current of approximately 2 ma. might flow through the person's body, the detector and alarm circuitry according to this invention becomes operative to warn of the incipient hazardous condition.

This might be especially necessary in any condition when a sudden drop in leakage resistance 24—even, perhaps, tending towards a short-circuit from the apparatus body 22 to the HV line 15—would cause a dramatic rise in voltage $V_B$ of the apparatus body 22 with respect to the most negative of the electric power lines, i.e. substantially ground potential.

The power for the logic circuits of the detector is supplied by the 12–24 volt battery 100 in the trolley. It comes into the detector through the 150 μM choke 102 to roll off high frequency transients. Additional filtering is provided by the 5.1 ohm resistor 104, the 33 volt metal oxide varistor 106, the diode 108 (also providing protection against incorrect wiring polarity), and the capacitors 2200 μb 110 and 0.1 μ 112. The voltage is then regulated to 5 volts by the regulartor IC 114. The 220 and 680 ohm resistors 116 and 118 establish the output voltage of the regulator. Capacitor 120 (0.1 μF) and capacitor 122 (10/35) provide for instantaneous current demands of the switching circuits and smooth the output of the regulator.

Since the negative side of the trolley battery 100 is connected to the body 22 of the trolley, and one of the overhead rails is earth grounded at each sub station, as the body of the trolley rises above earth ground a current path is established through the input OP amps 150 and 152, one high voltage resistor 154 (1 Meg), one high voltage diode 158, and the associated high voltage lead. Two high voltage diodes are provided on each high voltage lead to provide for a failsafe condition should one diode fail to open. Two resistor/diode paths are provided, since we must always find the most negative overhead rail (allowing the detector to operate regardless of the direction the trolley runs down the tracks). A high voltage connector 162 is also supplied which when removed, disconnects the connection between the two high voltage diodes to allow testing of each diode independently should the unit be suspected faulty.

OP amp 150 is set up as a linear DC amplifier with the gain established by the 150K and 200K resistors 164 and 166. Disregarding the 'Hysteresis' feed back loop (on pin 12), the output of this amplifier will swing from 0 to 5 volts as the trolley body swings from 0 to +60 volts relative to ground (−ve overhead rail). OP amp 152 acts as a comparator and toggles the output when it detects a voltage in excess of the present level on pin 6. The voltage divider on pin 6 allows the trip threshold level adjustment to be between 20 and 60 volts. When the threshold is exceeded the output pin 7 goes positive and 'shmitts' OP amp 150 through the 1 Meg and 10K ohm resistors on pin 12 thus preventing an unstable condition about the threshold level.

Figure 3:
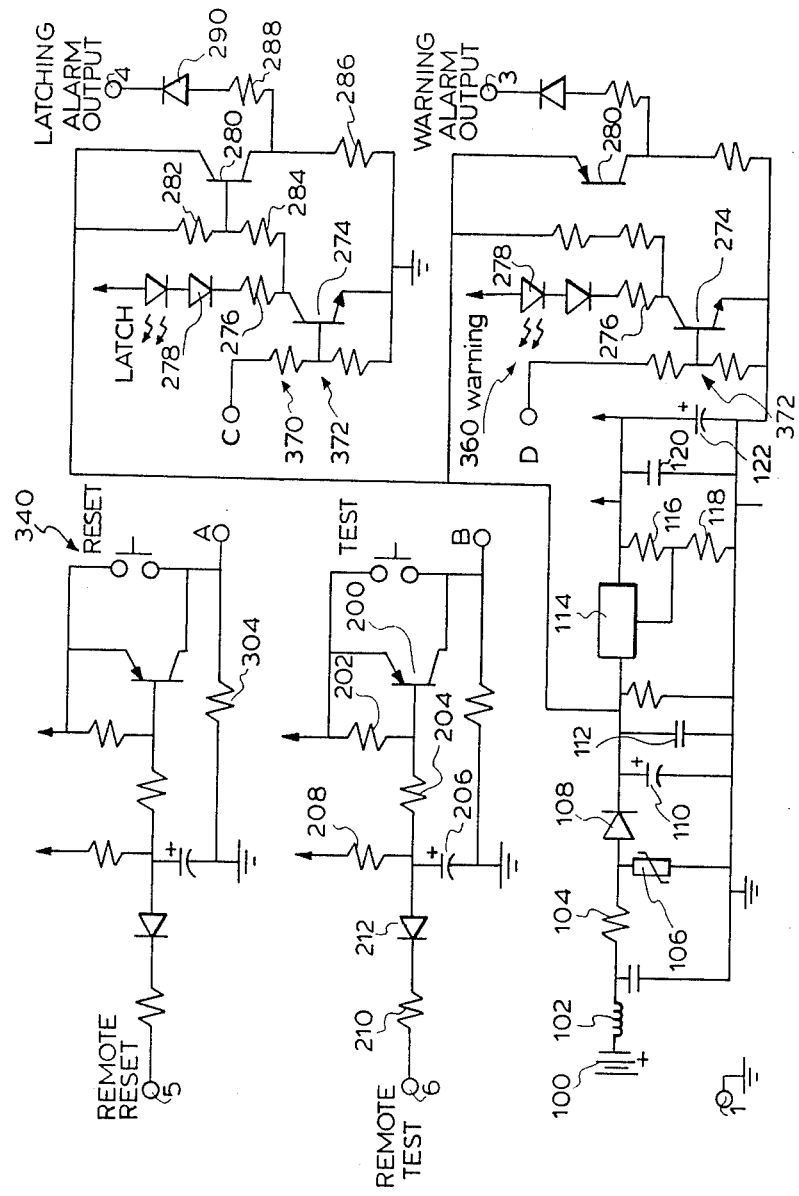
FIG. 3 is a circuit layout showing additional components of the alarm circuit of FIG. 2.

, The test push button and remote test circuitry (FIG. 3) pull OP amp 150 pin positive to force a 'detect' condition regardless of the voltage on pin 13. For the remote test circuit, the transistor 200 acts as a switch inverting the polarity of the input allowing the remote test switch to return to a common negative (−ve battery). The 10K resistor 202 to positive ensures that the transistor is noramally off. The other 10K resistor 209 on the base provides base drive to the transistor when the remote switch is operated. The 10 μF capacitor 206 and the two 27K resistors 208 and 210 provide a charge and discharge time constant delaying the action of the remote button by about 20 milliseconds to roll off contact bounce and any voltage spikes which may be present due to the length of wiring to the trolley's console. The diode 212 ensures that the circuit only recognizes a negative or ground potential.

OP amp 250 is again set up as a linear DC amplifier with OP amp 252 as a voltage following buffer. The gain of 250 is set by the 12K and 200K resistors 254 and 256 so that the output swings between 0 and 3 volts as the trolley body swings between 0 and +600 volts relative to ground. This pegs the negative end of the 100 $\mu$F capacitor 258 that establishes the amount of delay time to warning output. The diodes 160 on the inputs prevent the OP amps 250 and 252 from latching up if an extremely negative voltage appears on their inputs. The two 0.01 $\mu$F disc capacitors 260 on the input provide transisent roll off on the signal that feeds the OP amps.

OP amp 270 is set up as a comparator with hysteresis to detect AC voltage. A time constant is formed by the 0.1 $\mu$F capacitor 272 and 1 Meg ohm resistor 274 pumped by the diode 276 to yield a DC voltage on pin 3 that exceeds the level set on pin 2 when an Ac voltage peak in excess of the detect threshod appwars on pin 7 of OP amp 152. This again 'shmitts' OP amp 270 (through the 0.1 $\mu$F) and causes the output pin 1 to go positive. The net result is that an AC voltage (typically 60 hz) at the input to the detector who's peak voltage exceeds the trip level will also cause an alarm. The output of this circuit goes directly to the drive transistor 280 that feeds the 100 ohm current limiting resistor 282 and red 'Detect' led 284. This output also prevents the constant current source from charging the 100 $\mu$F timing capacitor 258, when an alarm is not present, by pulling a low on the capacitor through the 1K resistor 286 and the diode 288.

The constant current source formed by the 'Warning Alarm Delay' potentiometer 290, the transistor 292 and the three other resistors 294, 296 and 298 in that area charge the 100 $\mu$F capacitor 258 with a linear ramp. If the capacitor's negative end is pegged at 0 volts then, when an alarm is generated, the maximum time (depending on the setting of the current limiter) will result. If the negative end of the capacitor is not at 0 volts then the charge time for this capacitor will be reduced accordingly. This should show the need for a linear charging ramp since a 300 volt fault should take $\frac{1}{2}$ the time and a 600 volt fault should go ostensibly instantly. The 470 ohm resistor 294 on the current limiting transistor in limits the range of the delay adjustment and the 1K and 56K resistors 296 and 298 establish the transistors bias.

OP ramp 300 is again set up as a comparator with a 47K resistor 302 and 10K resistor 304 (FIG. 3) on pin 5 setting the threshold. This OP ramp amp senses the voltage on the 100 $\mu$F timing capacitor 258 and the output sits normally high. This then feeds OP amp 310, which, due to the positive feedback on pin 3 through the 33K resistor 312, forms $\frac{1}{2}$ of a 'latch'. OP amp 310 pin 3 normally sits at 1.2 volts with the 10K resistor 314 pulling low from the output of OP amp 320 and the 33K resistor 312 pulling high. When an alarm is detected, OP amp 310 pin 2 goes below the threshold on pin 3 forcing pin 1 positive. This releases the pull down (through the 270 diode 324 and 1K resistor 326) previously held on the second current limiter for the latching alarm delay and allows the second 100 $\mu$F capacitor 330 to charge. The current limiter here operates exactly the same way as for the 'Warning Alarm Delay'. Amp 320 forms the second $\frac{1}{2}$ of the 'latch'. When the 100 $\mu$F capacitor reaches the threshold level set on pin 13 of amp 320 (same as that set on amp 320 pin 5), then pin 14 of amp 320 goes positive and causes OP amp 310 pin 3 to be raised from 1.2 volts to the positive supply rail thereby latching the alarm since a high or a low on amp 310 pin 2 has no effect. The latch reset circuitry 340 is identical to the test and remote test circuitry. This operates by first—forcing a positive on pin 13 of OP amp 320 thereby causing pin 14 to be driven back down low, removing the positive feedback from OP amp 310 pin 3, and secondly—forcing pin 5 of OP amp 300 positive to make the output return high so that OP amp 310 pin 1 must now return low and discharge the 100 $\mu$F through the diode 324 and 1K resistor 326 to get back to the unlatched condition.

Since the 'latched condition' can only occur after the 'latching delay time' has expired, an output for 'Warning Alarm' can be taken from pin 1 of OP amp 310 and an output for 'Latching Alarm' can be taken from pin 14 of OP amp 320. Two identical output drive circuits 360 and 370 are provided on these locations. They consist of a voltage divider 372 to provide base drive to the transistor 274 who's collector drives the led through a 100 ohm resistor 276 (limiting the current) and a diode 278. The collector also provides the base drive to the level shifting transistor 280. When the transistor 274 is turned off, the collector rises to +24 volts (trolley battery). The diode 278 is required to protect the led against reverse polarity. The transistor 280 output drive transistors are normally held off by the 10K ohm resistor 282, and are turned on by the 1K resistor 284. Their collectors are normally pulled low by resistor 286 to overcome any emitter/collector leakage that may be present in the transistor. The collector then supplies current to the console device through the 27 ohm 5 watt resistor 288 (to limit the output current) and another diode 290. This diode protects the transistor from a positive going transient in excess of the 24 volt battery and allows 'wire OR' capability of the outputs i.e., two ouputs can be tied directly together without having one that is off, preventing the other from turning on.

The sensitivity of the detector can be adjusted to sense a voltage on the trolley body from 20 to 60 volts DC relative to the grounded overhead rail. The actual voltage sensitivity required varies from city to city and is specified by the transit authority. The adjustment is made with the detector installed in the trolley with the trolley disconnected from the overhead rails and instead connected to earth ground (i.e., a cold water pipe). To make the adjustment, a current limited power supply, set to the required voltage, must be placed on from trolley body to ground (+ve to body). The voltage sensitivity potentiometer is then adjusted to the point where the 'Detect' led just lights. This completes the sensitivity adjustment.

The time delays (again specified by the transit authority) can be adjusted by creating a 'Detect' condition with the use of the 'Test' button and timing with a stop watch the delay that occurs before the 'Warning' and-/or 'Latching' leds light.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. In a leakage resistance detector and alarm circuit for signalling an alarm status when a sensed voltage exceeds a predetermined minimum voltage after a predetermined maximum time period during which said sensed voltage continues to exceed said minimum voltage, the improvement comprising:

means for automatically varying the predetermined maximum time period in accordance with the sensed voltage and decreasing said time period as a function of the magnitude of said sensed voltage.

2. In a leakage detector as claimed in claim 1 wherein said means for automatically varying the time period automatically varies the time period in a linear manner.

3. In a leakage detector as claimed in claim 2 wherein the maximum voltage to be sensed is about 600 volts.

4. In a leakage detector as claimed in claim 1 wherein said means for automatically varying produces a signal the magnitude of which corresponds with the sensed voltage and is used to precharge a capacitor, said signalling of the alarm status requiring said capacitor to be fully charged and discharging, whereby the time required to charge the capacitor is decreased by the amount of precharging.

5. In a leakage detector circuit which actuates a warning alarm system when a voltage is sensed between a known maximum and a selectable minimum for the duration of a certain delay period, the improvement comprising:

means for varying the delay period in accordance with the magnitude of the sensed voltage to decrease the period and cause an early warning alarm signal.

6. In a leakage detector circuit as claimed in claim 5 wherein the means for automatically varying includes an operational amplifier which produces an output in proportion to the sensed voltage and charges a capacitor which discharges at the maximum voltage of the operational amplifier corresponding to the known maximum voltage to be sensed whereby a faster warning signal is produced in accordance with a rise in danger of the voltage sensed.

7. In a leakage detector circuit as claimed in claim 5 including means for sensing an AC signal and signalling an alarm condition.

8. In a leakage detector circuit as claimed in claim 7 wherein said means for sensing an AC signal and signalling an alarm condition acts independently of said means for automatically varying and is not delayed in time.

9. In a leakage detector circuit as claimed in claim 8 wherein said means for sensing an AC signal only operates when the voltage of the signal exceeds said predetermined minimum voltage.

* * * * *